(12) United States Patent
Moldoveanu et al.

(10) Patent No.: US 9,103,942 B2
(45) Date of Patent: Aug. 11, 2015

(54) METHODS AND SYSTEMS FOR SURVEY DESIGNS

(75) Inventors: Nicolae Moldoveanu, Houston, TX (US); Steven Fealy, Houston, TX (US); Kevin J. Deal, Haywards Heath (GB)

(73) Assignee: WesternGeco L.L.C., Houston, TX (US)

( * ) Notice: Subject to any disclaimer, the term of this patent is extended or adjusted under 35 U.S.C. 154(b) by 517 days.

(21) Appl. No.: 13/485,556

(22) Filed: May 31, 2012

(65) Prior Publication Data

US 2013/0107663 A1 May 2, 2013

Related U.S. Application Data

(60) Provisional application No. 61/552,973, filed on Oct. 28, 2011.

(51) Int. Cl.
  *G01V 1/38* (2006.01)

(52) U.S. Cl.
  CPC .................... *G01V 1/3817* (2013.01)

(58) Field of Classification Search
  USPC .......................................................... 367/16
  See application file for complete search history.

(56) References Cited

U.S. PATENT DOCUMENTS

| | | | |
|---|---|---|---|
| 2,404,440 A | 7/1946 | Holm | |
| 2,465,696 A | 3/1949 | Pasley | |
| 2,693,862 A | 11/1954 | Reiber | |
| 2,823,375 A | 2/1958 | Camp | |
| 3,283,293 A | 11/1966 | Pavey et al. | |
| 3,331,050 A | 7/1967 | Kilmer et al. | |
| 3,440,992 A | 4/1969 | Chance | |
| 3,505,577 A | 4/1970 | Hirokawa | |
| 3,506,674 A | 4/1970 | Berger | |
| 3,560,912 A | 2/1971 | Spink et al. | |
| 3,581,273 A | 5/1971 | Hedberg | |
| 3,605,674 A | 9/1971 | Weese | |
| 3,774,570 A | 11/1973 | Pearson | |
| 3,806,863 A | 4/1974 | Tilley et al. | |
| 3,896,756 A | 7/1975 | Pearson et al. | |
| 3,921,124 A | 11/1975 | Payton | |
| 3,934,220 A | 1/1976 | Davis | |
| 3,953,827 A | 4/1976 | Le Moal et al. | |

(Continued)

FOREIGN PATENT DOCUMENTS

| | | |
|---|---|---|
| EP | 0 018053 A1 | 10/1980 |
| EP | 0 018053 B1 | 12/1983 |

(Continued)

OTHER PUBLICATIONS

International Search Report and Written Opinion of PCT Application No. PCT/US2012/062049 dated Feb. 25, 2013: pp. 1-8.

(Continued)

*Primary Examiner* — James Hulka
(74) *Attorney, Agent, or Firm* — Gary Gex

(57) ABSTRACT

Methods and systems for survey designs are disclosed. In one embodiment, a method of towing an array of marine streamers is disclosed, wherein: the array includes a plurality of receivers, the array includes a plurality of steering devices, and the array is towed along a first portion of a coil sail path; steering the array of marine streamers along two or more depths; and steering the array of marine streamers to a slant angle while maintaining the array of marine streamers at their respective two or more depths.

21 Claims, 11 Drawing Sheets

(56) References Cited

U.S. PATENT DOCUMENTS

| | | | |
|---|---|---|---|
| 4,033,278 A | 7/1977 | Waters | |
| 4,068,208 A | 1/1978 | Rice, Jr. et al. | |
| 4,074,648 A | 2/1978 | Reid et al. | |
| 4,086,504 A | 4/1978 | Ezell et al. | |
| 4,146,870 A | 3/1979 | Ruehle | |
| 4,231,111 A | 10/1980 | Neeley | |
| 4,290,124 A | 9/1981 | Cole | |
| 4,353,121 A | 10/1982 | Ray et al. | |
| 4,383,259 A | 5/1983 | Rader | |
| 4,404,664 A | 9/1983 | Zachariadis | |
| 4,468,663 A | 8/1984 | Kalt | |
| 4,486,863 A | 12/1984 | French | |
| 4,648,080 A | 3/1987 | Hargreaves | |
| 4,657,482 A | 4/1987 | Neal | |
| 4,669,097 A | 5/1987 | Bristol | |
| 4,709,355 A | 11/1987 | Woods et al. | |
| 4,729,333 A | 3/1988 | Kirby et al. | |
| 4,757,482 A | 7/1988 | Fiske, Jr. | |
| 4,803,668 A | 2/1989 | Berryhill et al. | |
| 4,834,181 A | 5/1989 | Uhri et al. | |
| 4,890,568 A | 1/1990 | Dolengowski | |
| 4,912,684 A | 3/1990 | Fowler | |
| 4,942,991 A | 7/1990 | Lyons | |
| 4,960,183 A | 10/1990 | Young, II | |
| 4,965,773 A | 10/1990 | Marschall | |
| 4,970,696 A | 11/1990 | Crews et al. | |
| 4,970,697 A | 11/1990 | Earley et al. | |
| 4,992,990 A | 2/1991 | Langeland et al. | |
| 4,992,991 A * | 2/1991 | Young et al. | 367/20 |
| 4,992,992 A | 2/1991 | Dragoset, Jr. | |
| 5,031,159 A | 7/1991 | Rouquette | |
| 5,179,905 A | 1/1993 | Hossfield et al. | |
| 5,200,930 A | 4/1993 | Rouquette | |
| 5,300,929 A | 4/1994 | MacLeod | |
| 5,329,071 A | 7/1994 | Vatne et al. | |
| 5,353,223 A | 10/1994 | Norton et al. | |
| 5,430,689 A | 7/1995 | Rigsby et al. | |
| 5,443,027 A | 8/1995 | Owsley et al. | |
| H001490 H | 9/1995 | Thompson et al. | |
| 5,508,973 A | 4/1996 | Mallick et al. | |
| 5,532,975 A | 7/1996 | Elholm | |
| 5,546,882 A | 8/1996 | Kuche | |
| 5,555,531 A | 9/1996 | Booth et al. | |
| 5,640,325 A | 6/1997 | Banbrook et al. | |
| 5,668,775 A | 9/1997 | Hatteland | |
| 5,677,893 A | 10/1997 | de Hoop et al. | |
| 5,761,152 A | 6/1998 | Jacobsen et al. | |
| 5,790,472 A | 8/1998 | Workman et al. | |
| 5,973,995 A | 10/1999 | Walker et al. | |
| 5,978,316 A | 11/1999 | Ambs et al. | |
| 6,011,752 A | 1/2000 | Ambs et al. | |
| 6,011,753 A | 1/2000 | Chien | |
| 6,044,040 A | 3/2000 | Holland | |
| 6,061,301 A | 5/2000 | Corrigan | |
| 6,144,342 A | 11/2000 | Bertheas et al. | |
| 6,175,809 B1 | 1/2001 | Naville | |
| 6,178,381 B1 | 1/2001 | Padhi et al. | |
| 6,285,956 B1 | 9/2001 | Bennett et al. | |
| 6,292,754 B1 | 9/2001 | Thomsen | |
| 6,343,256 B1 | 1/2002 | Winbow et al. | |
| 6,418,378 B1 | 7/2002 | Nyland | |
| 6,477,111 B1 | 11/2002 | Lunde et al. | |
| 6,477,711 B1 | 11/2002 | Freeman et al. | |
| 6,493,636 B1 | 12/2002 | DeKok | |
| 6,525,992 B1 | 2/2003 | Olivier et al. | |
| 6,529,832 B1 | 3/2003 | Kerekes | |
| 6,553,315 B2 | 4/2003 | Kerekes et al. | |
| 6,590,831 B1 | 7/2003 | Bennett et al. | |
| 6,629,037 B1 | 9/2003 | Nyland | |
| 6,671,223 B2 | 12/2003 | Bittleston | |
| 6,684,160 B1 | 1/2004 | Ozbek et al. | |
| 6,691,038 B2 | 2/2004 | Zajac | |
| 6,714,873 B2 | 3/2004 | Bakulin et al. | |
| 6,837,175 B1 | 1/2005 | Gieseke | |
| 6,847,896 B1 | 1/2005 | Orban et al. | |
| 6,862,531 B2 | 3/2005 | Horne et al. | |
| 6,865,487 B2 | 3/2005 | Charron | |
| 6,932,017 B1 | 8/2005 | Hillesund et al. | |
| 6,944,094 B1 | 9/2005 | Thomsen et al. | |
| 7,065,449 B2 | 6/2006 | Brewster et al. | |
| 7,080,607 B2 | 7/2006 | Hillesund et al. | |
| 7,203,130 B1 | 4/2007 | Welker | |
| 7,239,577 B2 | 7/2007 | Tenghamn et al. | |
| 7,293,520 B2 | 11/2007 | Hillesund et al. | |
| 7,377,224 B2 | 5/2008 | Ryan et al. | |
| 7,391,673 B2 | 6/2008 | Regone et al. | |
| 7,400,552 B2 | 7/2008 | Moldoveanu et al. | |
| 7,403,448 B2 | 7/2008 | Welker et al. | |
| 7,616,522 B2 | 11/2009 | Rouquette | |
| 7,660,189 B2 | 2/2010 | Vigen et al. | |
| 7,679,990 B2 | 3/2010 | Herkenhoff et al. | |
| 7,952,522 B2 | 5/2011 | Hohl | |
| 7,965,583 B2 | 6/2011 | Thomas | |
| 8,004,930 B2 | 8/2011 | Welker et al. | |
| 8,559,265 B2 * | 10/2013 | Moldoveanu et al. | 367/16 |
| 8,681,580 B2 * | 3/2014 | Moldoveanu et al. | 367/15 |
| 8,681,581 B2 * | 3/2014 | Moldoveanu et al. | 367/15 |
| 2002/0193947 A1 | 12/2002 | Chamberlain | |
| 2003/0067842 A1 | 4/2003 | Sukup et al. | |
| 2003/0125878 A1 | 7/2003 | Bakulin et al. | |
| 2004/0042341 A1 | 3/2004 | Tenghamn et al. | |
| 2004/0066707 A1 | 4/2004 | Tenghamn et al. | |
| 2004/0125697 A1 | 7/2004 | Fleming | |
| 2004/0240319 A1 | 12/2004 | Carvill et al. | |
| 2005/0018537 A1 | 1/2005 | Welker et al. | |
| 2005/0180260 A1 | 8/2005 | Planke et al. | |
| 2005/0180263 A1 | 8/2005 | Lambert et al. | |
| 2005/0194201 A1 | 9/2005 | Tenghamn et al. | |
| 2006/0215489 A1 | 9/2006 | Solheim et al. | |
| 2006/0227657 A1 | 10/2006 | Tveide et al. | |
| 2006/0239117 A1 | 10/2006 | Singh et al. | |
| 2006/0256653 A1 | 11/2006 | Toennessen et al. | |
| 2006/0256654 A1 | 11/2006 | Paulsen | |
| 2006/0285435 A1 | 12/2006 | Robertsson | |
| 2007/0064526 A1 | 3/2007 | Holo | |
| 2007/0104028 A1 | 5/2007 | Van Manen et al. | |
| 2007/0115757 A1 * | 5/2007 | Soerli et al. | 367/144 |
| 2007/0127312 A1 | 6/2007 | Storteig et al. | |
| 2007/0159921 A1 | 7/2007 | Regone et al. | |
| 2007/0165486 A1 | 7/2007 | Moldoveanu et al. | |
| 2007/0274153 A1 | 11/2007 | Bisley et al. | |
| 2008/0008037 A1 | 1/2008 | Welker | |
| 2008/0239875 A1 | 10/2008 | Alumbaugh et al. | |
| 2008/0253225 A1 | 10/2008 | Welker et al. | |
| 2008/0267010 A1 | 10/2008 | Moldoveau et al. | |
| 2008/0285380 A1 | 11/2008 | Rouquette | |
| 2008/0285381 A1 | 11/2008 | Moldoveanu et al. | |
| 2009/0122640 A1 | 5/2009 | Hill et al. | |
| 2009/0231953 A1 | 9/2009 | Welker et al. | |
| 2009/0245019 A1 | 10/2009 | Falkenberg et al. | |
| 2009/0262601 A1 | 10/2009 | Hillesund et al. | |
| 2009/0310439 A1 | 12/2009 | Hauan et al. | |
| 2009/0310440 A1 | 12/2009 | Solheim et al. | |
| 2009/0316525 A1 | 12/2009 | Welker | |
| 2010/0013485 A1 | 1/2010 | Alumbaugh et al. | |
| 2010/0027374 A1 | 2/2010 | Moldoveanu et al. | |
| 2010/0118645 A1 | 5/2010 | Welker | |
| 2010/0142317 A1 | 6/2010 | Moldoveanu et al. | |
| 2010/0238762 A1 | 9/2010 | Hornbostel | |
| 2011/0158041 A1 * | 6/2011 | Moldoveanu et al. | 367/14 |
| 2011/0158042 A1 * | 6/2011 | Moldoveanu et al. | 367/15 |
| 2011/0176384 A1 | 7/2011 | Soubaras | |
| 2011/0260730 A1 | 10/2011 | Sudow et al. | |
| 2011/0305109 A1 * | 12/2011 | Soubaras | 367/24 |
| 2012/0092956 A1 | 4/2012 | Soubaras | |
| 2012/0134234 A1 * | 5/2012 | Roberts et al. | 367/19 |
| 2012/0213033 A1 * | 8/2012 | Soubaras | 367/24 |
| 2013/0242695 A1 * | 9/2013 | Soubaras | 367/17 |
| 2013/0301384 A1 | 11/2013 | Hill et al. | |

FOREIGN PATENT DOCUMENTS

| | | |
|---|---|---|
| EP | 0 321705 A2 | 6/1989 |
| EP | 0 347019 A2 | 12/1989 |

(56) References Cited

FOREIGN PATENT DOCUMENTS

| | | |
|---|---|---|
| EP | 0 562781 A2 | 9/1993 |
| EP | 0 613025 A1 | 8/1994 |
| EP | 0 613025 B1 | 9/1998 |
| EP | 0 681193 B1 | 8/1999 |
| GB | 2093610 A | 9/1982 |
| GB | 2144854 A | 3/1985 |
| GB | 2342081 A | 4/2000 |
| GB | 2390902 A | 1/2004 |
| GB | 2424949 A | 10/2006 |
| GB | 2436206 A | 9/2007 |
| WO | 84-03153 A1 | 8/1984 |
| WO | 96-21163 A1 | 7/1996 |
| WO | 97-11395 A2 | 3/1997 |
| WO | 97-30361 A1 | 8/1997 |
| WO | 97-45006 A1 | 12/1997 |
| WO | 98-28636 A1 | 7/1998 |
| WO | 00-20895 A1 | 4/2000 |
| WO | 01-29580 A1 | 4/2001 |
| WO | 2004-092771 A2 | 10/2004 |
| WO | 2005-062075 A1 | 7/2005 |
| WO | 2006-014750 A2 | 2/2006 |
| WO | 2007-070499 A2 | 6/2007 |
| WO | 2008-144492 A2 | 11/2008 |
| WO | 2010-002600 A2 | 1/2010 |
| WO | 2011086149 | 7/2011 |
| WO | 2011086166 | 7/2011 |
| WO | 2011161118 | 12/2011 |

OTHER PUBLICATIONS

Moldoveanu, "Circular Geometry for Wide-azimuth Towed-streamer Acquisition," 70th EAGE Conference & Exhibition, Jun. 2008: pp. 1-5.
Moldoveanu et al., "What is the next step after WAZ for exploration in the Gulf of Mexico?" SEG Houston International Exposition and Annual Meeting, 2009: pp. 41-45.
PCT Search Report and Written Opinion; PCT/US2010/062419; Sep. 26, 2011.
PCT Search Report and Written Opinion; PCT/US2010/035063; Dec. 29, 2010.
PCT Search Report and Written Opinion; PCT/US2009/060864; May 1, 2010.
PCT Search Report and Written Opinion; PCT/US2009/063538; Apr. 30, 2010.
PCT Search Report and Written Opinion; PCT/US2009/047015; Feb. 24, 2010.
PCT Search Report and Written Opinion; PCT/US2009/047019; Jan. 7, 2010.
PCT Search Report and Written Opinion; PCT/US2009/045261; Dec. 23, 2009.
PCT Search Report and Written Opinion; PCT/US2008/063875; Sep. 16, 2009.
UKIPO examination report (Aug. 10, 2009) and search report (Aug. 7, 2009) for GB 0912870.3.
SIPO Reexamination Notice After Final (May 4, 2014); CN 200880021257.8.
EPO Search Report (Mar. 25, 2014); EP 2010778189.0.
EPO Office Action (Dec. 4, 2013); EP 2008755677.3.
Mexican associate reporting dated Oct. 2013 for IMPI Office Action (Jul. 8, 2013); MX/a/2012/007769.
UKIPO Examination Report (Oct. 16, 2012); GB 1216841.5.
UKIPO Examination Report (Jul. 2, 2012); GB 1019201.1.
PCT Search Report and Written Opinion; PCT/US2009/031396; May 14, 2009.
IPAU Examination Report (Jun. 21, 2012); AU 2008254856.
SIPO Rejection Decision (Jun. 6, 2012) and SIPO Office Actions (Feb. 6, 2012 and Jul. 20, 2011); CN 200880021257.8.
Mexican associate reportings dated Jul. 2012, Oct. 2011, and Apr. 2011 for IMPI Office Actions; MX/a/2009/012362.
UKIPO Examination Reports (May 18, 2012 and Feb. 13, 2012); GB 1019199.7.
Mexican associate reportings dated Aug. 2012 and Mar. 2012 for IMPI Office Actions; MX/a/2010/013018.
IPAU Examination Report (May 16, 2008); AU 2006252148.
SIPO Office Action (Nov. 19, 2010); CN 200710003980.0.
UKIPO Examination Reports (Jun. 8, 2010, Mar. 17, 2010, Nov. 13, 2009, Aug. 10, 2009, and Feb. 6, 2009) and UKIPO Search Report (Jul. 18, 2007); GB 0700970.9.
Mexican associate reporting dated Jun. 2009 for IMPI Office Action; PA/a/2007/000733.
Moldoveanu, et al; Full Azimuth Imaging Using Circular Geometry Acquisition; Leading Edge; vol. 27, No. 7; pp. 908-913; Jul. 2008.
Hennenfent, et al.; "Simply Denoise: Wavefield Reconstructions via Jittered Undersampling"; Geophysics; vol. 73(2); pp. v19-v28; May-Jun. 2008.
Hennenfent, et al.; "Random Sampling: New Insights into the Reconstruction of Coarsely-Sampled Wavefields"; SEG Annual Meeting; pp. 2575-2579; Oct. 2007.
WesternGeco Q-Technology URL: http://www.westerngeco.com/content/services/q_technology/index.asp 2006—No Longer Exists.
Bacon, et al.; "3-D Seismic Interpretation"; Cambridge University Press; pp. 18-22 and 25-26; 2003.
Sukup; "Wide Azimuth Marine Acquisition by the Helix Method": The Leading Edge; pp. 791-794; Aug. 2002.
Pan; "Single-Sensor Towed Streamer Improves Seismic Acquisition"; Offshore; Apr. 2002.
Austad, et al.; Marine Seismic Cable Streering and Computerized Control Systems; Society of Exploration Geophysicists, Expanded Abstracts; 2000.
Bittleston, et al; Marine Seismic Cable Streering and Control; EAGE 62nd Conference and Technical Exhibition, Glasgow, Scotland; May-Jun. 2000.
Beasley, et al.; A New Look at Simultaneous Sources; SEG Expanded Abstracts; 1998.
Wong, et al.; "Sampling with Hammersley and Halton Points"; 2 Journal of Graphics Tools; pp. 9-24; 1997.
Pedersen; A Nautical Study of Towed Marine Seismic Streamer Cable Configurations; Norwegian University of Science and Technology Doctoral Thesis; 1996.
Pedersen; Active 3-D Position Control of Marine Flexible Cylinder Cables with Extremely Large Length/Diameter-Ratio; NTH Department of Marine Hydrodynamics; 1994-1995.
Reilly, et al; "Concentric Circle 3D: Optimization of Salt Diapir Flank Imaging UK Central North Sea"; First Break; vol. 12, No. 9; pp. 463-475; Sep. 1994.
Shames; Mechanics of Fluids, 3rd Ed.; McGraw-Hill; pp. 666-693; 1992.
Pedersen; A Feasibility Study of the Possibilty to Control the Horizontal Position of Seismic Streamer Cables; Division of Marine Hydrodynamics, The Norwegian Institute of Technology; Mar. 1992.
Raven; Automatic Control Engineering, 4th Ed.; McGraw-Hill; 1987.
Cole, et al.; "A Circular Seismic Acquisition Technique for Marine Three Dimensional Surveys"; Offshore Technology Conference, 4864; Houston, Texas; May 6-9, 1985.
Shames; Engineering Mechanics—Statics and Dynamics, 3rd Ed.; Prentice Hall; pp. 236-244; 1980.
Longobardo; Automatic Controls; Standard Handbook for Mechanical Engineers; pp. 16-33 through 16-34; 1967.
Lee; An Algorithm for Path Connections and its Applications; IRE Transcations on Electronic Computers; pp. 346-365; Sep. 1961.
Kalman; A New approach to Linear Filtering and Prediction Problems; Trans of ASME—Journal of Basic Engineering; vol. 82 (Series D); pp. 35-45; 1960.

\* cited by examiner

METHODS AND SYSTEMS FOR SURVEY DESIGNS

CROSS-REFERENCE TO RELATED APPLICATION

This application claims benefit of U.S. Provisional Patent Application Ser. No. 61/552973 filed Oct. 28, 2011, which is incorporated herein by reference in its entirety.

BACKGROUND

In a typical seismic survey, a plurality of seismic sources, such as explosives, vibrators, airguns or the like, may be sequentially activated near the surface of the earth to generate energy (i.e., seismic waves) which may propagate into and through the earth. The seismic waves may be reflected back by geological formations within the earth, and the resultant seismic wave field may be sampled by a plurality of seismic receivers, such as geophones, hydrophones and the like. Each receiver may be configured to acquire seismic data at the receiver's location, normally in the form of a seismogram representing the value of some characteristic of the seismic wave field against time. The acquired seismograms or seismic data may be transmitted wirelessly or over electrical or optical cables to a recorder system. The recorder system may then store, analyze, and/or transmit the seismic data. This data may be used to generate and image of subsurface formations in the earth and may also be used to detect the possible presence of hydrocarbons, changes in the subsurface formations and the like.

In a marine seismic survey, seismic data typically include up-going waves that are reflected off of the surface of the earth and down-going waves that are reflected from the sea surface. The up-going waves may be used to detect the possible presence of hydrocarbons, changes in the subsurface and the like. The down-going waves (i.e., sea-surface ghost waves), however, may destructively interfere with the up-going waves at certain frequencies such that the up-going waves are completely canceled out of the seismic data.

In some situations, using a coil-oriented sail path for marine seismic surveys can be beneficial and more efficient than traditional straight sail lines for acquisition. Moreover, having a streamer array that can be oriented in varying geometries, such as varying streamer depths, during a coil-based marine survey can have additional benefits over traditional marine surveys.

Accordingly, there is a need for methods and systems that can employ faster, more efficient and more accurate marine surveys, such as coil-based acquisition in varying configurations. Such methods and systems may complement or replace conventional methods and systems for marine surveys.

SUMMARY

The above deficiencies and other problems associated with marine surveys are reduced or eliminated by the disclosed methods and devices.

Described herein are implementations of various technologies and techniques for a method for acquiring data, including, but not limited to seismic data since the method can be used successfully with other collected data domains such as electromagnetic where an array of data collectors on cables or streamers are towed.

In accordance with some embodiments, a method is performed that includes towing an array of marine streamers that includes a plurality of receivers and a plurality of steering devices along a first portion of a coil sail path; steering the array of marine streamers along two or more depths; and steering the array of marine streamers to a slant angle while maintaining the array of marine streamers at their respective two or more depths.

In accordance with some embodiments, a survey system is provided that includes a vessel, a computing system, and an array of marine streamers that includes a plurality of receivers and a plurality of steering devices. The computing system includes at least one processor, at least one memory, and one or more programs stored in the at least one memory, wherein the one or more programs are configured to be executed by the one or more processors, the one or more programs including instructions for configuring the survey system to: tow the array of marine streamers along a first portion of a coil sail path; steer the array of marine streamers along two or more depths; and steer the array of marine streamers to a slant angle while maintaining the array of marine streamers at their respective two or more depths.

In some embodiments, the survey system's computing system includes a first computing device and a second computing device, wherein the first computing device is configured to control the towing of the array of marine streamers along the first portion of the coil sail path and one or more additional computing devices are configured to steer one or more streamers in the array of marine streamers. In further embodiments, the first computing device is configured to at least partially control and/or assist in navigation of the vessel in the survey system so that the vessel's sail path substantially corresponds to the coil sail path. In alternate embodiments, a first computing device in the computing system is configured to control the towing of the array of marine streamers along the first portion of the coil sail path and steer the array of marine streamers.

In accordance with some embodiments, a computer readable storage medium for use in a survey system is provided, the medium having a set of one or more programs including instructions that, when executed by a computing system in the survey system, cause the computing system to configure the survey system for towing an array of marine streamers having a plurality of receivers and a plurality of steering devices along a first portion of a coil sail path. The instructions executed on the computing system also configure the survey system for steering the array of marine streamers along two or more depths; and steering the array of marine streamers to a slant angle while maintaining the array of marine streamers at their respective two or more depths.

In accordance with some embodiments, a survey system is provided that includes means for towing an array of marine streamers that include a plurality of receivers and a plurality of steering devices. The survey system also includes means for towing the array along a first portion of a coil sail path; means for steering the array of marine streamers along two or more depths; and means for steering the array of marine streamers to a slant angle while maintaining the array of marine streamers at their respective two or more depths.

In accordance with some embodiments, a method is performed that includes receiving a data set collected by a plurality of marine streamers having a plurality of receivers, wherein the received data set corresponds to a subterranean region, and while collecting the data set, the plurality of marine streamers was towed along a first portion of a coil sail path, at a slant angle, and at two or more depths; and processing the collected data, wherein the processing includes one or more techniques selected from the group consisting of stacking, imaging, full waveform inversion, inversion, deconvolution, migration, deghosting, reverse time migration, mirror migration, zero-phase Wiener deconvolution, and blueness correction.

In accordance with some embodiments, a computing system is provided that includes at least one processor, at least one memory, and one or more programs stored in the at least one memory, wherein the one or more programs are configured to be executed by the one or more processors, the one or more programs including instructions for receiving a data set collected by a plurality of marine streamers having a plurality of receivers, wherein the received data set corresponds to a subterranean region, and while collecting the data set, the plurality of marine streamers was towed along a first portion of a coil sail path, at a slant angle, and at two or more depths; and processing the collected data, wherein the processing includes one or more techniques selected from the group consisting of stacking, imaging, full waveform inversion, inversion, deconvolution, migration, deghosting, reverse time migration, mirror migration, zero-phase Wiener deconvolution, and blueness correction.

In accordance with some embodiments, a computer readable storage medium is provided, the medium having a set of one or more programs including instructions that when executed by a computing system cause the computing system to receive a data set collected by a plurality of marine streamers having a plurality of receivers, wherein the received data set corresponds to a subterranean region, and while collecting the data set, the plurality of marine streamers was towed along a first portion of a coil sail path, at a slant angle, and at two or more depths; and process the collected data, wherein the processing includes one or more techniques selected from the group consisting of stacking, imaging, inversion, full waveform inversion, deconvolution, migration, deghosting, reverse time migration, mirror migration, zero-phase Wiener deconvolution, and blueness correction.

In accordance with some embodiments, a computing system is provided that includes at least one processor, at least one memory, and one or more programs stored in the at least one memory; and means for receiving a data set collected by a plurality of marine streamers having a plurality of receivers, wherein the received data set corresponds to a subterranean region, and while collecting the data set, the plurality of marine streamers was towed along a first portion of a coil sail path, at a slant angle, and at two or more depths; and means for processing the collected data, wherein the processing includes one or more techniques selected from the group consisting of stacking, imaging, inversion, full waveform inversion, deconvolution, migration, deghosting, reverse time migration, mirror migration, zero-phase Wiener deconvolution, and blueness correction.

In accordance with some embodiments, an information processing apparatus for use in a computing system is provided, and includes means for receiving a data set collected by a plurality of marine streamers having a plurality of receivers, wherein the received data set corresponds to a subterranean region, and while collecting the data set, the plurality of marine streamers was towed along a first portion of a coil sail path, at a slant angle, and at two or more depths; and means for processing the collected data, wherein the processing includes one or more techniques selected from the group consisting of stacking, imaging, full waveform inversion, inversion, deconvolution, migration, deghosting, reverse time migration, mirror migration, zero-phase Wiener deconvolution, and blueness correction.

In accordance with some embodiments, a survey system is provided that includes a vessel and a steerable array of marine streamers including a plurality of receivers and a plurality of steering devices, wherein the steerable array of marine streamers is configured to be towed along two or more depths along a coil sail path, and the steerable array of marine streamers is configured to be steered to a slant angle while maintaining the array of marine streamers at their respective two or more depths.

In some embodiments, an aspect of the invention includes that the plurality of receivers include one or more seismic receivers.

In some embodiments, an aspect of the invention includes that the plurality of receivers include one or more electromagnetic receivers.

In some embodiments, an aspect of the invention includes that the plurality of receivers include one or more seismic receivers and one or more electromagnetic receivers.

In some embodiments, an aspect of the invention includes that the array of marine streamers is steered using the plurality of steering devices.

In some embodiments, an aspect of the invention includes that the plurality of steering devices comprises one or more birds, one or more deflectors, one or more tail buoys or combinations thereof.

In some embodiments, an aspect of the invention includes that the array of marine streamers is steered to the two or more depths using the one or more birds.

In some embodiments, an aspect of the invention includes that the array of marine streamers is steered to the slant angle using the deflectors.

In some embodiments, an aspect of the invention includes that the array of marine streamers is steered to the slant angle using the tail buoys.

In some embodiments, an aspect of the invention includes that the slant angle is determined at least in part based on the size of a subsurface bin from which a set of survey data is to be acquired.

In some embodiments, an aspect of the invention includes that respective proximate ends of one or more streamers in the array of streamers are maintained at a first depth selected from the two or more depths; and respective distal ends of one or more streamers in the array of streamers are maintained at a second depth selected from the two or more depths.

In some embodiments, an aspect of the invention includes that the two or more depths increase in a cross line direction.

In some embodiments, an aspect of the invention includes that the slant angle includes variable depths along a length of the streamer array.

In some embodiments, an aspect of the invention includes that the slant angle includes variable depths along a crossline direction of the streamer array.

In some embodiments, an aspect of the invention includes that the slant angle includes variable depths along a crossline direction of the streamer array and variable depths along a length of the streamer array.

In some embodiments, an aspect of the invention involves towing one or more sources; and producing one or more energy emissions from the one or more sources while towing the array of marine streamers in the first portion of the coil sail path.

In some embodiments, an aspect of the invention includes that the one or more sources are towed by a first vessel, and the streamer array is towed by a second vessel.

In some embodiments, an aspect of the invention includes that the one or more sources and the streamer array are towed by a first vessel.

In some embodiments, an aspect of the invention involves collecting data at one or more of the plurality of receivers, wherein the collected data corresponds to respective returns from the subsurface of respective energy emissions in the one or more energy emissions emitted from the one or more sources.

Thus, the systems and methods disclosed herein are faster, more efficient methods for marine surveys. These systems and methods increase marine surveys effectiveness, efficiency, and accuracy. Such methods and systems may complement or replace conventional methods for marine surveys.

BRIEF DESCRIPTION OF THE DRAWINGS

For a better understanding of the aforementioned embodiments as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
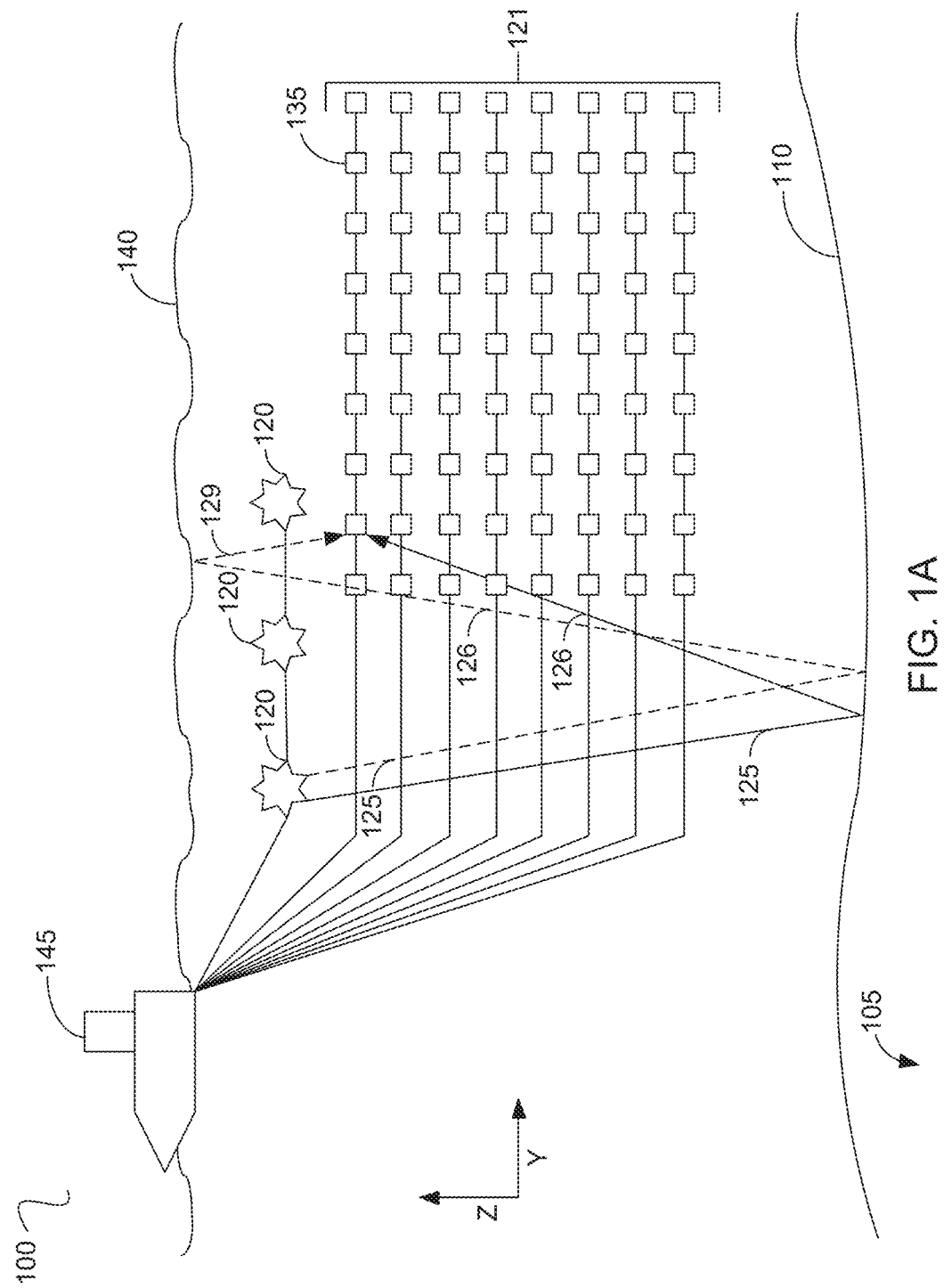
FIGS. 1A-P illustrate varying marine survey configurations in accordance with some embodiments.

Reference will now be made in detail to embodiments, examples of which are illustrated in the accompanying drawings and figures. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered the same object or step.

The terminology used in the description of the invention herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context.

The following paragraphs provide a brief summary of various technologies and techniques directed at attenuating the effects of sea-surface ghost waves in seismic data in accordance with one or more implementations described herein. The seismic data may be acquired using a variety of survey configurations. In one implementation, streamers that include seismic receivers may be towed at various depths. For instance, each streamer may be towed at a different depth such that the streamers are arranged in an order of increasing or decreasing depth from left to right. Alternatively, the streamers may be arranged in a symmetric manner such that the two middle streamers are towed at the same depth, and the next two streamers outside the middle streamers are towed at the same depth that is deeper than the middle streamers, and so on.

In addition to towing streamers at different depths, each streamer may be towed at a slant from the inline direction, while preserving a constant streamer depth.

In another implementation, the streamers towed at the various depths and slant described above may also be towed to follow circular tracks to perform a coil survey.

Figure 2:
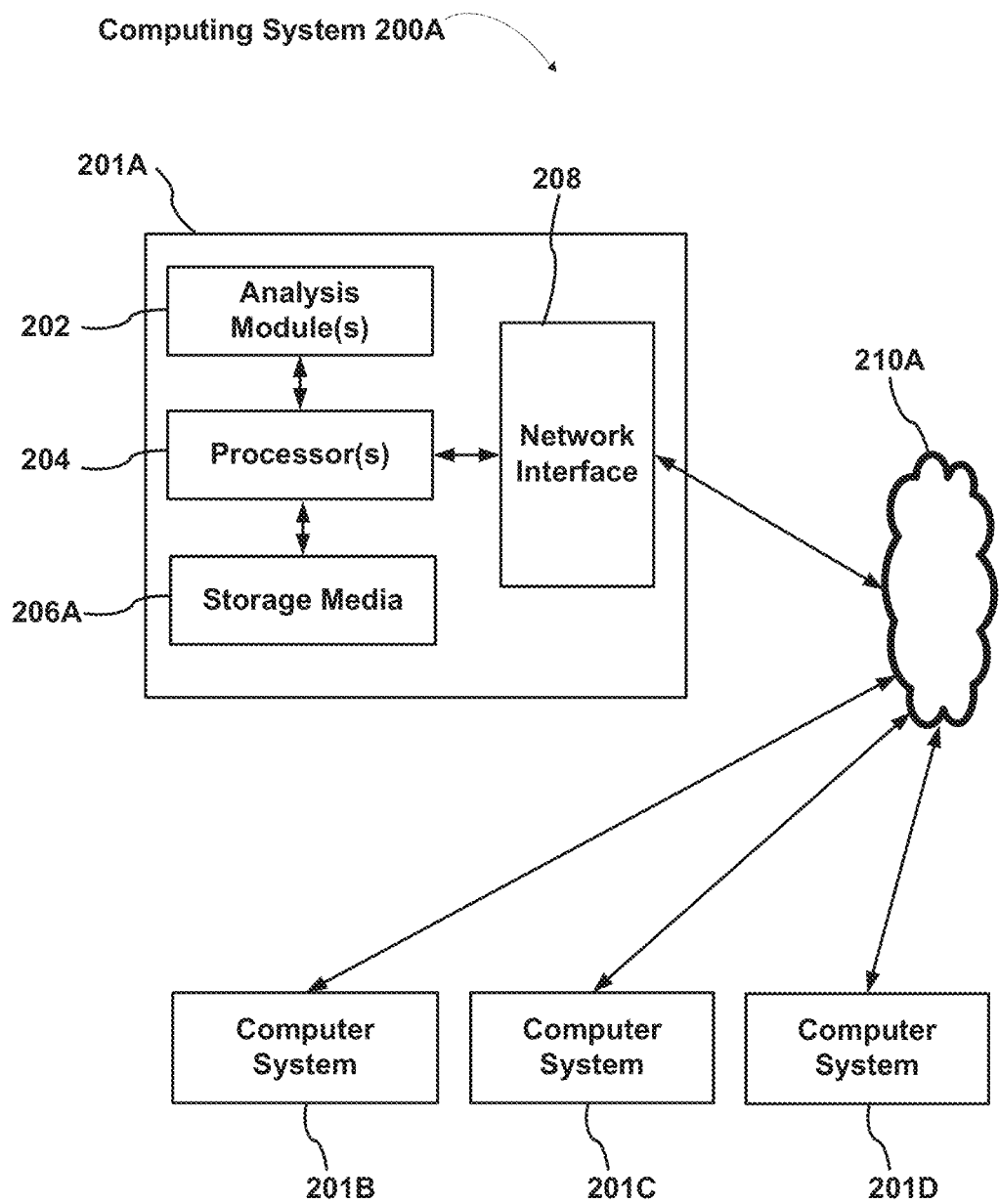
FIG. 2 illustrates a computing system in accordance with some embodiments.

After acquiring the seismic data using the survey configurations described above, a computer application which may be executed on a computing system, such as computing system 200A of FIG. 2, may perform a time alignment on the acquired seismic data. Since the seismic data are acquired from receivers disposed on streamers that are towed at different depths, the time alignment may correct the seismic data for being acquired at different depths.

The computer application may then collect a portion of the seismic data into one or more summation contribution gathers. A summation contribution gather may be defined as a portion of the seismic data that may be added together and processed in a manner that would result in a single data trace that corresponds to the acquired seismic data.

After obtaining the summation contribution gathers, the computer application may then sum the portion of the seismic data (i.e., the traces) in the summation contribution gathers to generate seismic data that have residual ghost wavelets without deep frequency notches (i.e., without sea-surface ghost waves that destructively interfere with the up-going waves).

The computer application may then apply a suitable spectral shaping filter, for example a zero-phase Wiener deconvolution filter, to the summed seismic data to widen the seismic data amplitude spectrum. As a result, the computer application may use the filtered seismic data to obtain a sub-surface image that approximates the image that would be acquired by imaging only up-going waves in the seismic data, without performing an explicit wavefield separation into up- and down-going waves.

Survey Configurations

Figure 1B:
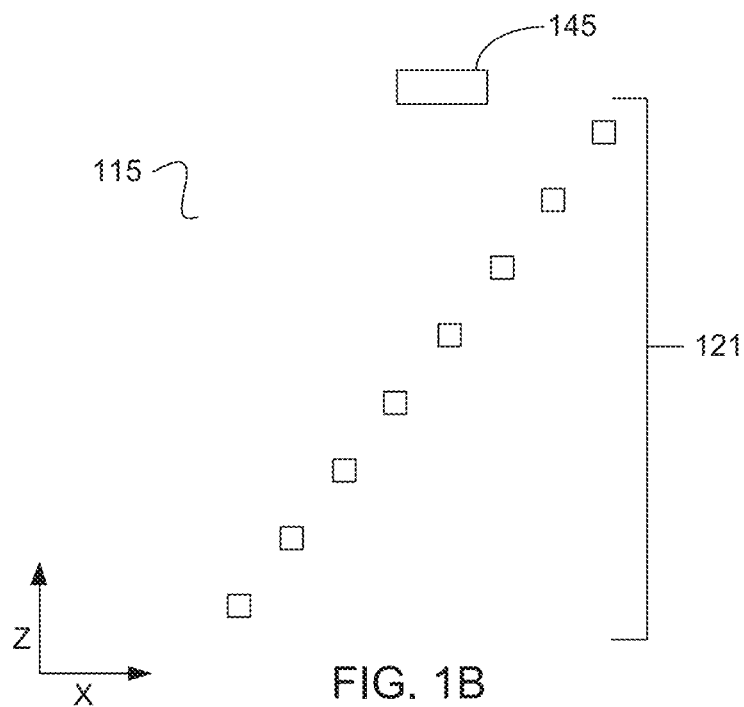
Figure 1C:
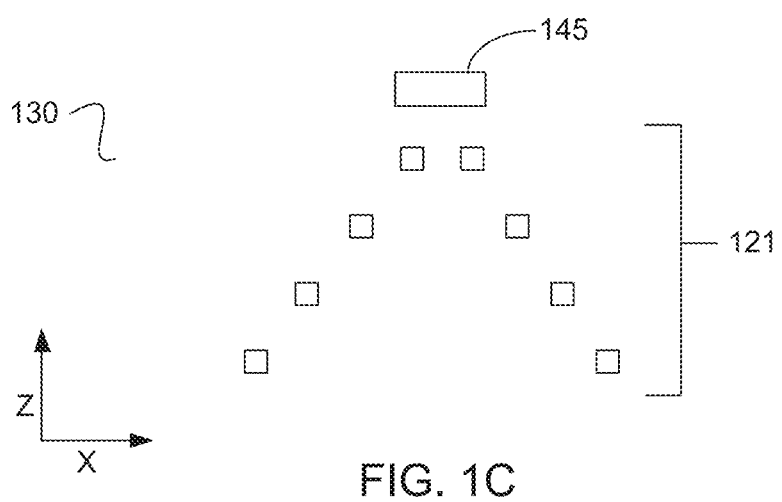
Figure 1D:
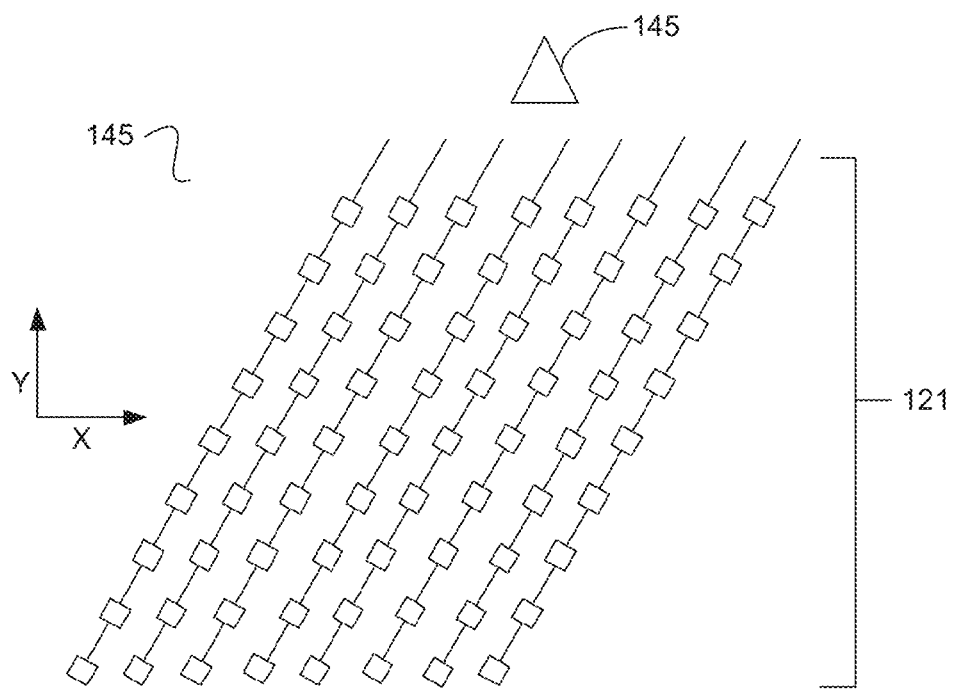
Figure 1E:
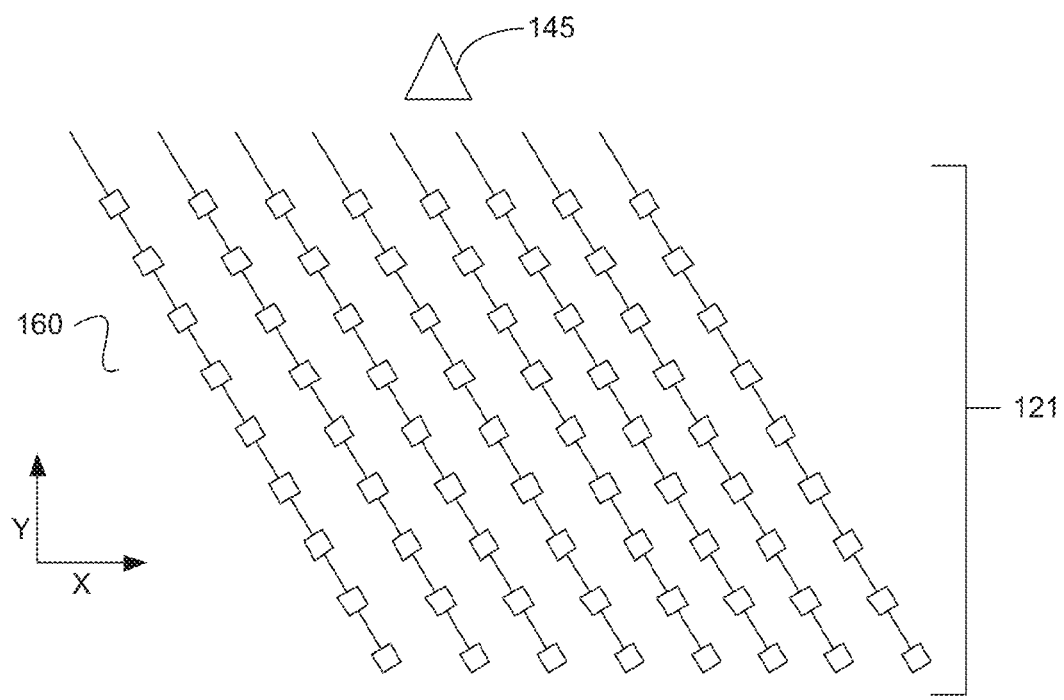
Figure 1F:
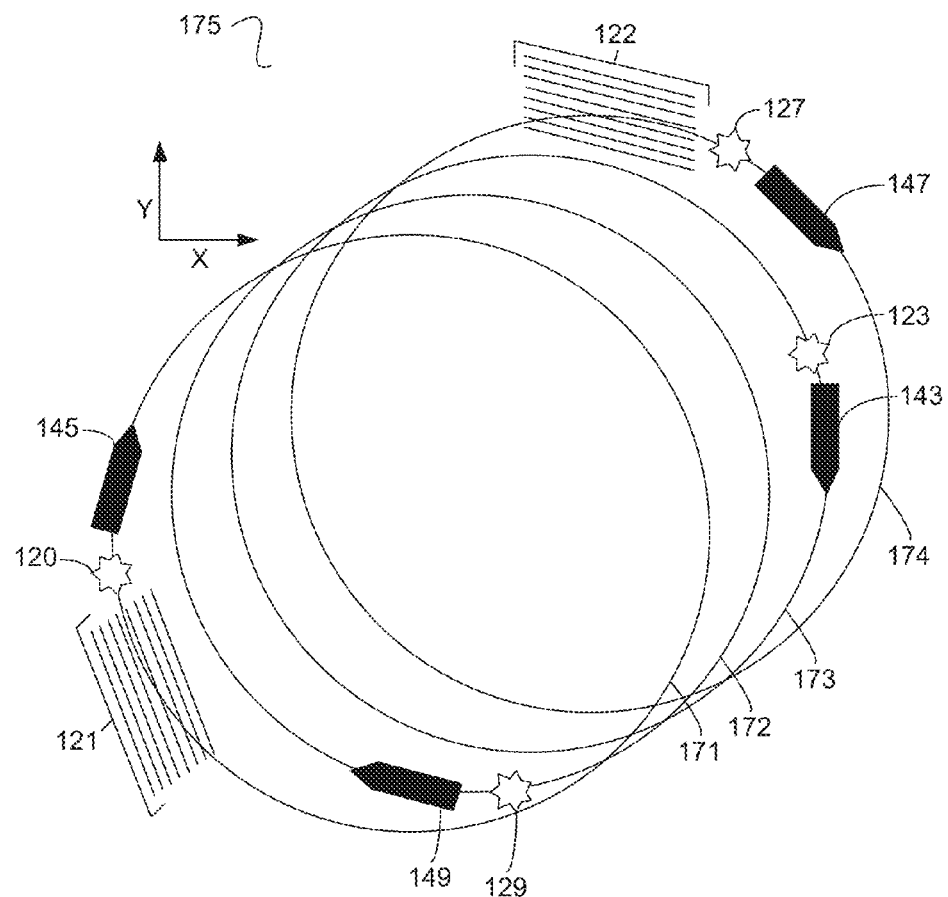
Figure 1G:
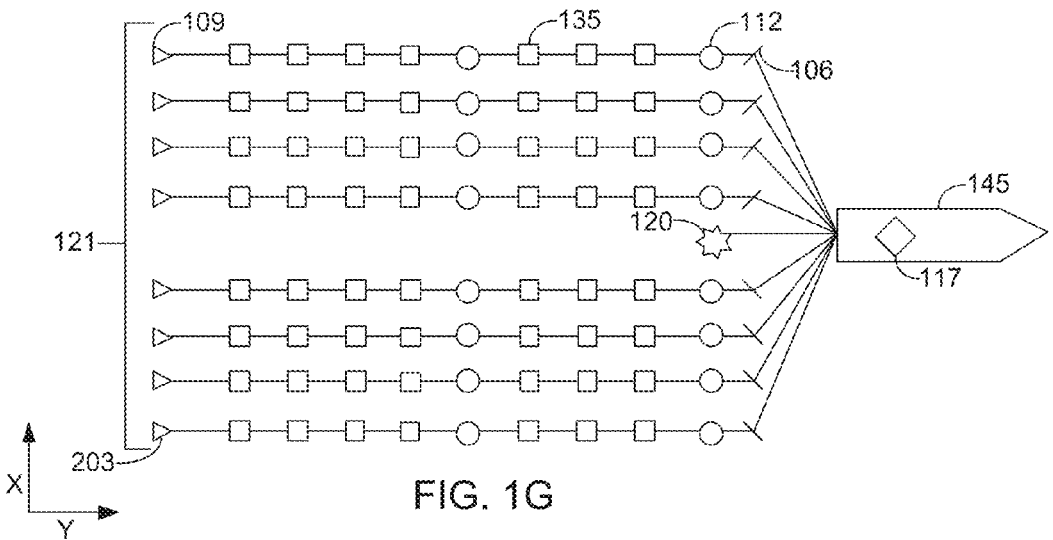
Figure 1H:
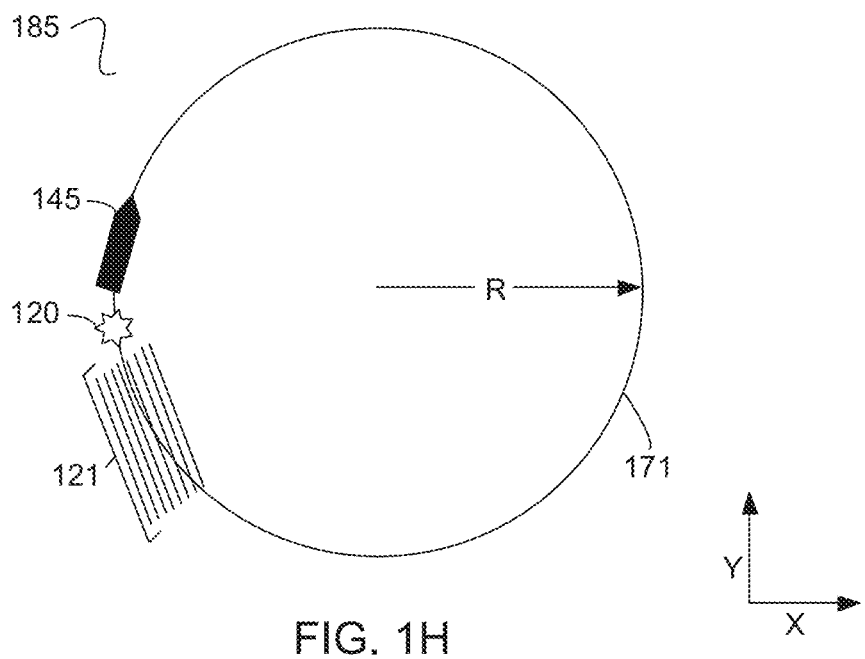
Figure 1I:
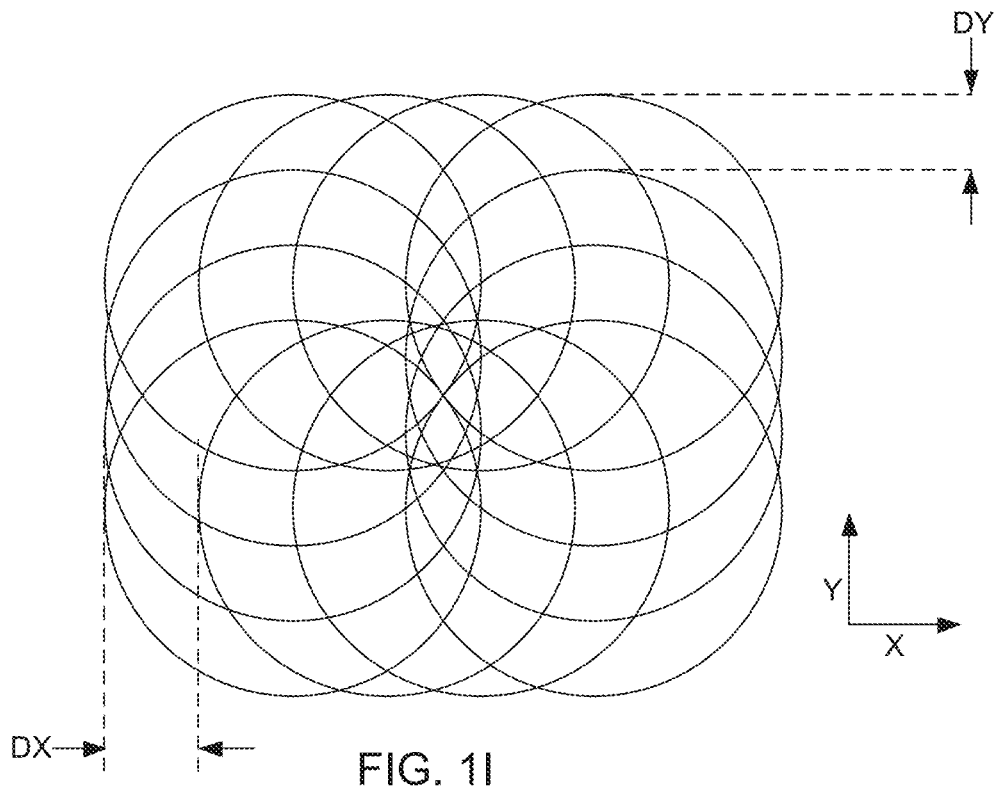
Figure 1J:
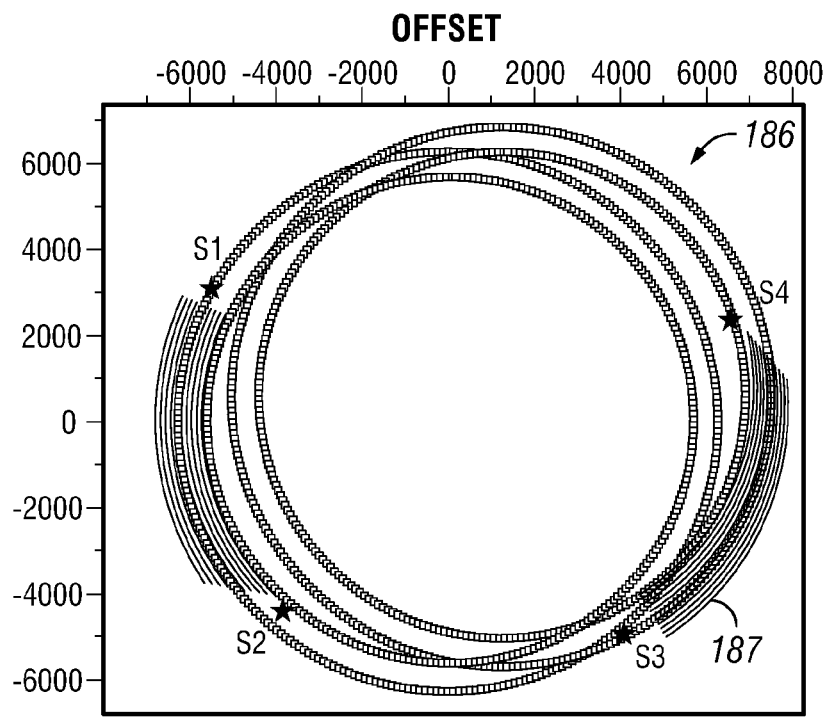
Figure 1K:
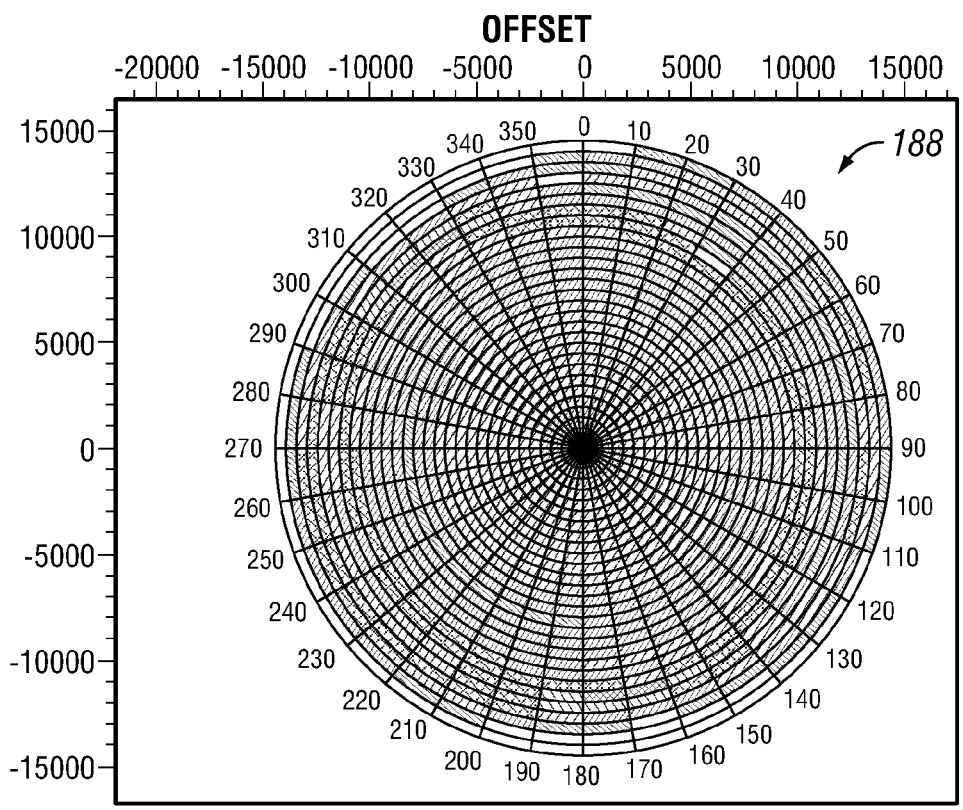
Figure 1L:
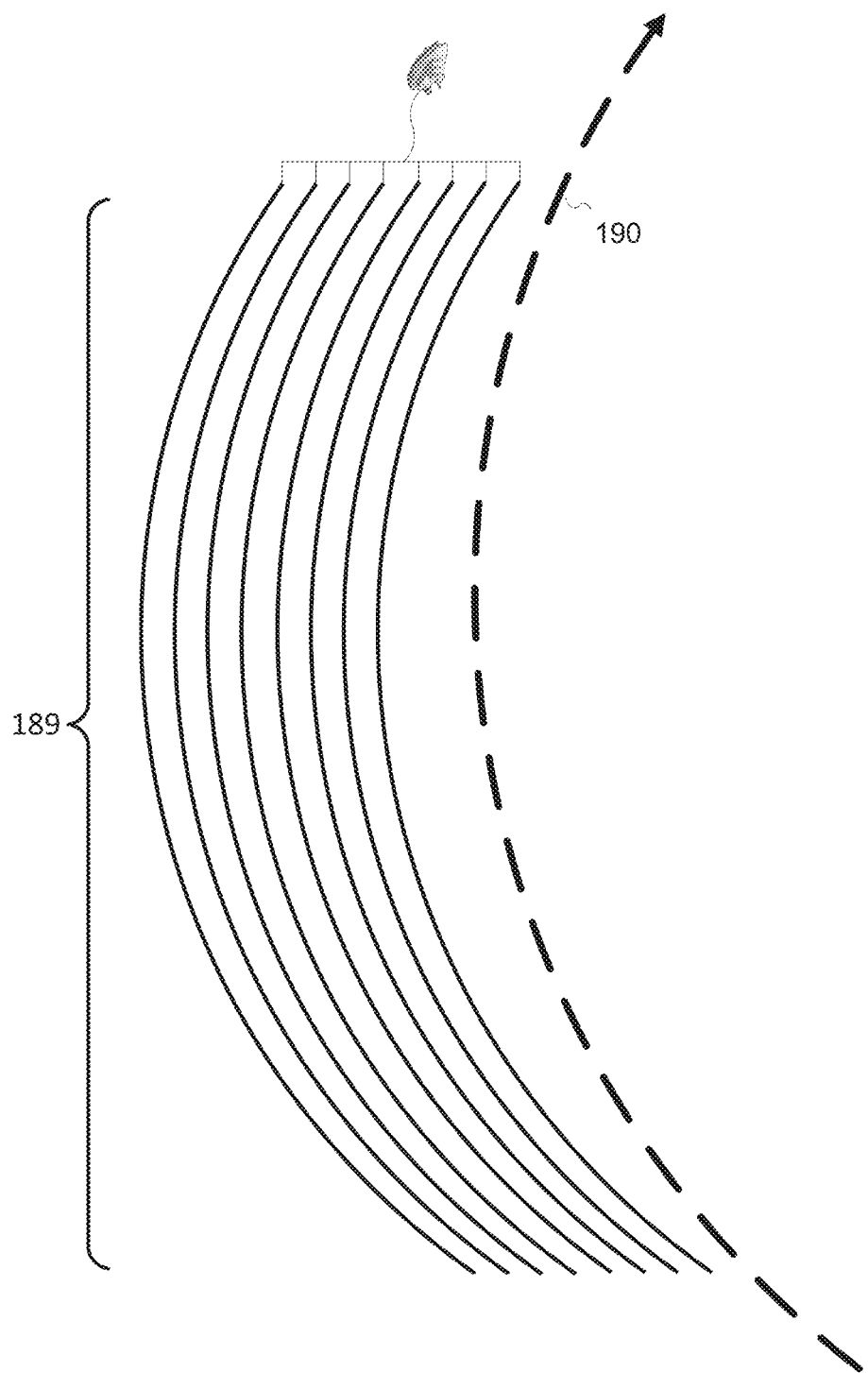
Figure 1M:
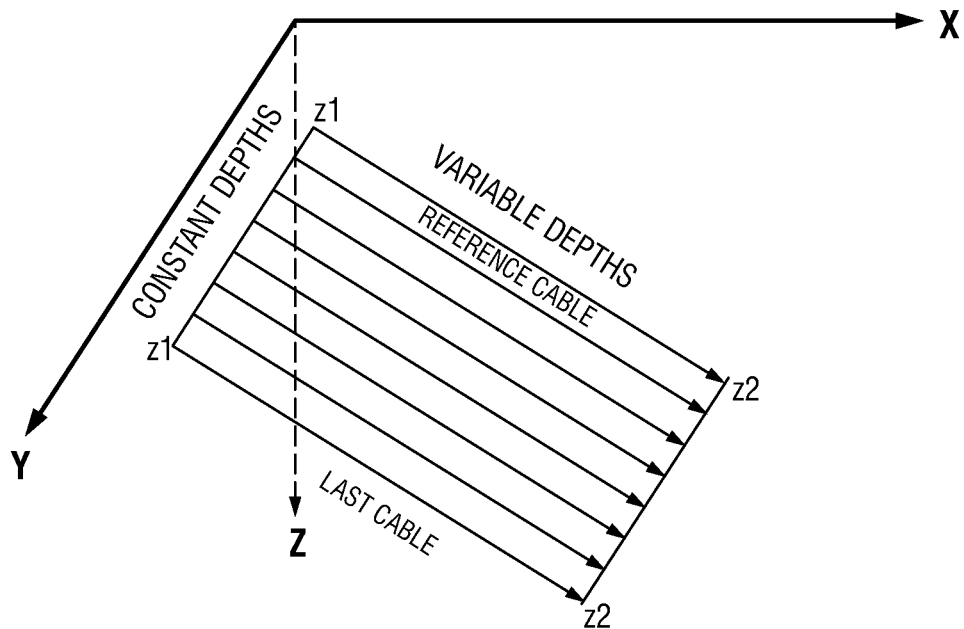
Figure 1N:
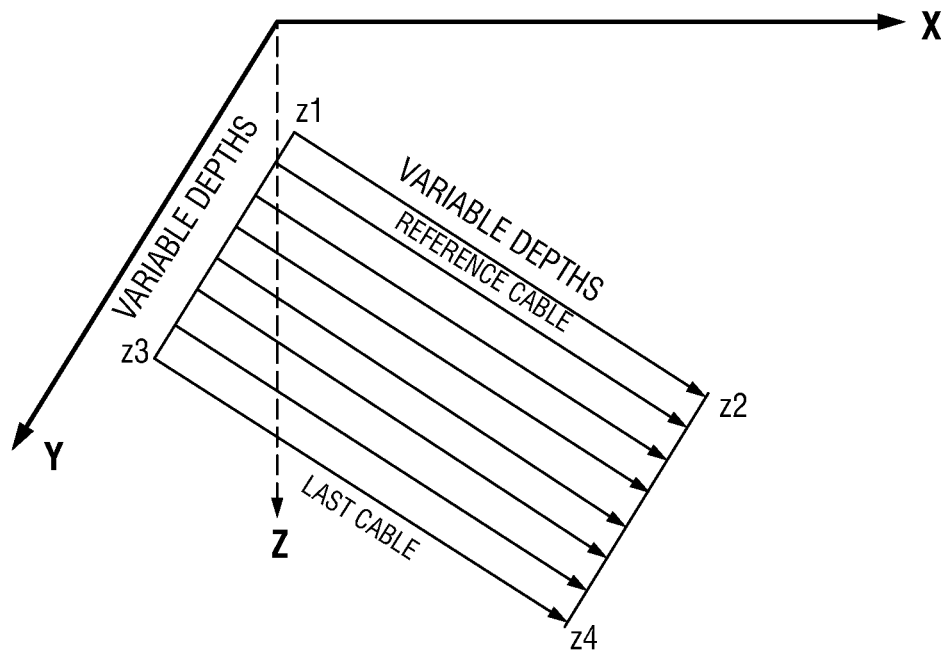
Figure 10:
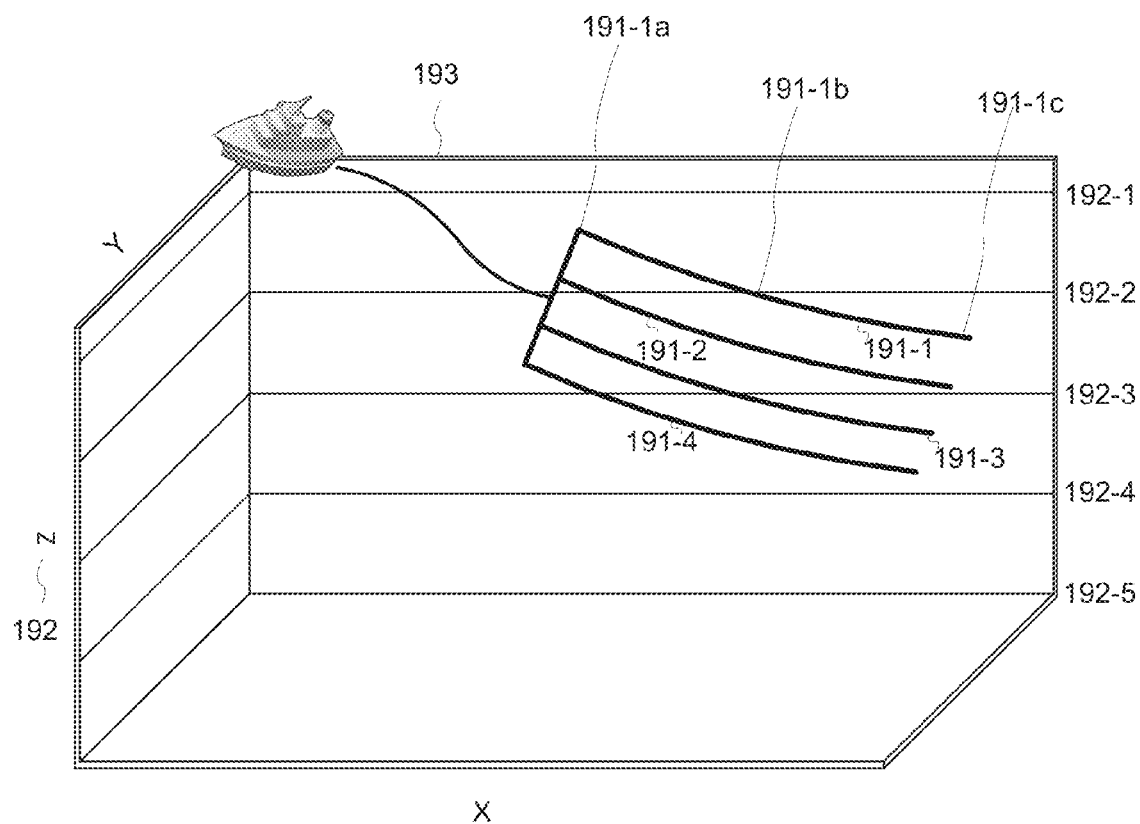
Figure 1P:
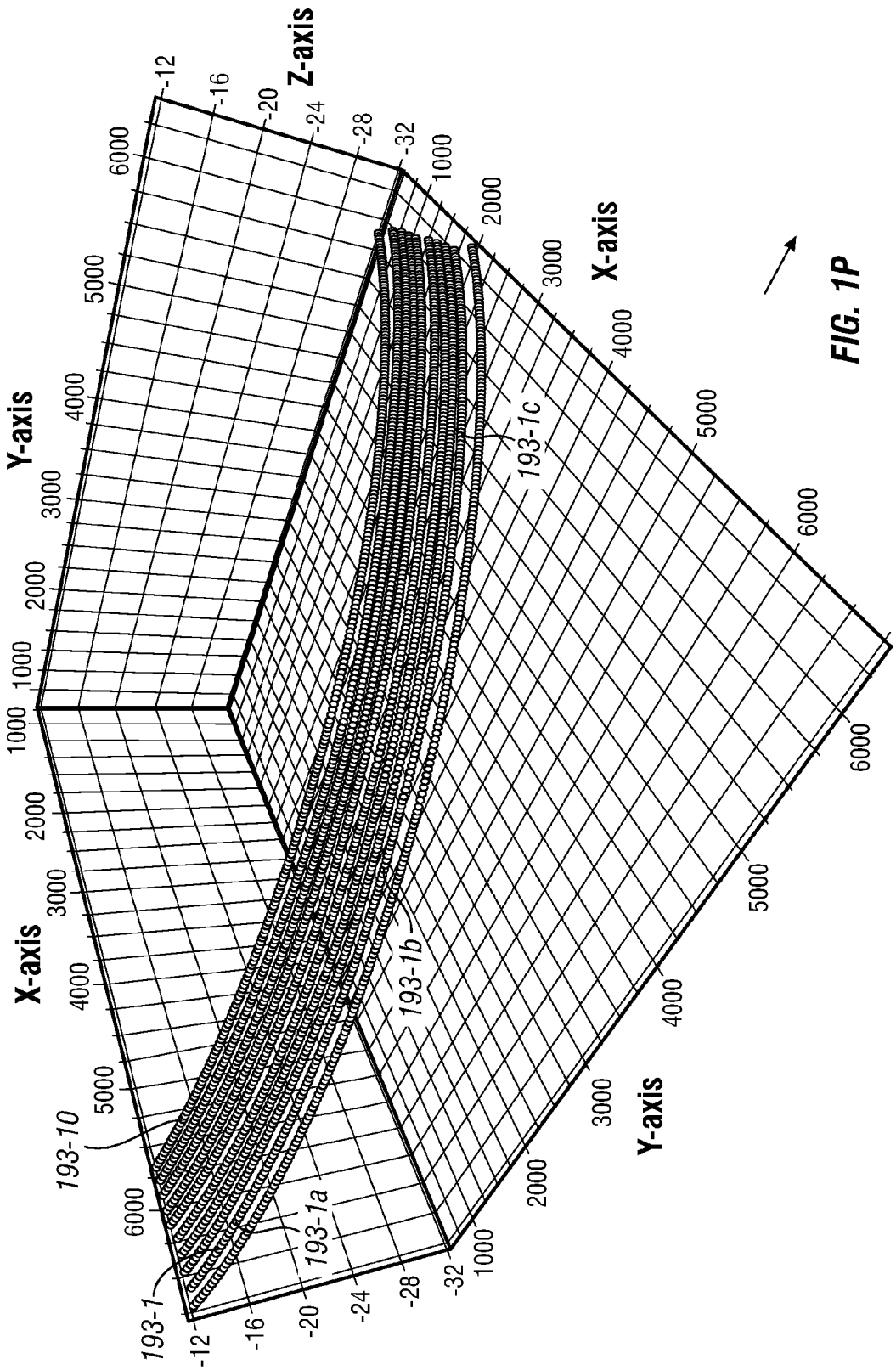

Attention is now directed to FIGS. 1A-1P, which illustrate marine survey configurations in accordance with varying embodiments.

Multiple Streamer/Multiple Depth Survey Configuration

FIG. 1A illustrates a side view of a marine-based survey 100 of a subterranean subsurface 105 in accordance with one or more implementations of various techniques described herein. Subsurface 105 includes seafloor surface 110. Seismic sources 120 may include marine vibroseis sources, which may propagate seismic waves 125 (e.g., energy signals) into the Earth over an extended period of time or at a nearly instantaneous energy provided by impulsive sources. The seismic waves may be propagated by marine vibroseis sources as a frequency sweep signal. For example, the marine vibroseis sources may initially emit a seismic wave at a low frequency (e.g., 5 Hz) and increase the seismic wave to a high frequency (e.g., 80-90Hz) over time.

The component(s) of the seismic waves 125 may be reflected and converted by seafloor surface 110 (i.e., reflector), and seismic wave reflections 126 may be received by a plurality of seismic receivers 135. Seismic receivers 135 may be disposed on a plurality of streamers (i.e., streamer array 121). The seismic receivers 135 may generate electrical signals representative of the received seismic wave reflections 126. The electrical signals may be embedded with information regarding the subsurface 105 and captured as a record of seismic data.

In one implementation, each streamer may include streamer steering devices such as a bird, a deflector, a tail buoy and the like. The streamer steering devices may be used to control the position of the streamers in accordance with the techniques described herein. The bird, the deflector and the tail buoy is described in greater detail with reference to FIG. 1G below.

In one implementation, seismic wave reflections 126 may travel upward and reach the water/air interface at the water surface 140, a majority portion of reflections 126 may then reflect downward again (i.e., sea-surface ghost waves 129) and be received by the plurality of seismic receivers 135. The sea-surface ghost waves 129 may be referred to as surface multiples. The point on the water surface 140 at which the wave is reflected downward is generally referred to as the downward reflection point.

The electrical signals may be transmitted to a vessel 145 via transmission cables, wireless communication or the like. The vessel 145 may then transmit the electrical signals to a data processing center. Alternatively, the vessel 145 may include an onboard computer capable of processing the electrical signals (i.e., seismic data). Those skilled in the art having the benefit of this disclosure will appreciate that this illustration is highly idealized. For instance, surveys may be of formations deep beneath the surface. The formations may typically include multiple reflectors, some of which may include dipping events, and may generate multiple reflections (including wave conversion) for receipt by the seismic receivers 135. In one implementation, the seismic data may be processed to generate a seismic image of the subsurface 105.

Typically, marine seismic acquisition systems tow each streamer in streamer array 121 at the same depth (e.g., 5-10 m). However, marine based survey 100 may tow each streamer in streamer array 121 at different depths such that seismic data may be acquired and processed in a manner that avoids the effects of destructive interference due to sea-surface ghost waves. For instance, marine-based survey 100 of FIG. 1A illustrates eight streamers towed by vessel 145 at eight different depths. The depth of each streamer may be controlled and maintained using the birds disposed on each streamer. In one implementation, streamers can be arranged in increasing depths such that the leftmost streamer is the deepest streamer and the rightmost streamer is the shallowest streamer or vice versa. (See FIG. 1B).

Alternatively, the streamers may be arranged in a symmetric manner such that the two middle streamers are towed at the same depth; the next two streamers outside the middle streamers are towed at the same depth that is deeper than the middle streamers and so on. (See FIG. 1C). In this case, the streamer distribution would be shaped as an inverted V. Although marine survey 100 has been illustrated with eight streamers, in other implementations marine survey 100 may include any number of streamers.

In addition to towing streamers at different depths, each streamer of a marine-based survey may be slanted from the inline direction, while preserving a constant streamer depth. (See FIG. 1D and FIG. 1E). In one implementation, the slant of each streamer may be obtained and maintained using the deflector and/or the tail buoy disposed on each streamer. The angle of the slant may be approximately 5-6 degrees from the inline direction. The angle of the slant may be determined based on the size of the subsurface bins. A subsurface bin may correspond to a certain cell or bin within the subsurface of the earth, typically 25 m long by 25 m wide, where seismic surveys acquire the seismic data used to create subsurface images. In this manner, the slant angle may be larger for larger subsurface bin sizes and may be smaller for smaller subsurface bin sizes. The slant may be used to acquire seismic data from several locations across a streamer such that sea-surface ghost interference may occur at different frequencies for each receiver.

Multiple Streamer/Multiple Depth Coil Survey Configuration

In another implementation, streamers may be towed at different depths and towed to follow circular tracks such as that of a coil survey. (See FIGS. 1F, 1H & 1I). In one implementation, the coil survey may be performed by steering a vessel in a spiral path (See FIG. 1I). In another implementation, the coil survey may be performed by towing multiple vessels in a spiral path such that a first set of vessels tow just sources and a second set of vessels tow both sources and streamers. The streamers here may also be towed at various depths. For instance, the streamers may be arranged such that the leftmost streamer is the deepest streamer and the rightmost streamer is the shallowest streamer, or vice versa. The streamers may also be arranged such that they form a symmetrical shape (e.g., inverted V shape). Like the implementations described above, each streamer of the coil survey may also be slanted approximately from the inline direction, while preserving a constant streamer depth. Additional details with regard to multi-vessel coil surveys may be found in U.S. Patent Application Publication No. 2010/0142317 (which is hereby incorporated by reference in its entirety), and in the discussion below with reference to FIGS. 1F-1G.

FIG. 1F illustrates an aerial view of a multi-vessel marine-based coil survey 175 of a subterranean subsurface in accordance with one or more implementations of various techniques described herein. Coil survey 175 illustrated in FIG. 1F is provided to illustrate an example of how a multi-vessel coil survey 175 may be configured. However, it should be understood that multi-vessel coil survey 175 is not limited to the example described herein and may be implemented in a variety of different configurations.

Coil survey 175 may include four survey vessels 143/145/147/149, two streamer arrays 121/122, and a plurality of sources 120/123/127/129. The vessels 145/147 are "receiver vessels" in that they each tow one of the streamer arrays 121/122, although they also tow one of the sources 120/127. Because the receiver vessels 145/147 also tow sources 120/127, the receiver vessels 145/147 are sometimes called "streamer/source" vessels or "receiver/source" vessels. In one implementation, the receiver vessels 145/147 may omit sources 120/127. Receiver vessels are sometimes called "streamer only" vessels if they tow streamer arrays 121/122 and do not tow sources 120/127. Vessels 143/149 are called "source vessels" since they each tow a respective source or source array 123/129 but no streamer arrays. In this manner, vessels 143/149 may be called "source only" vessels.

Each streamer array 121/122 may be "multicomponent" streamers. Examples of suitable construction techniques for multicomponent streamers may be found in U.S. Pat. Nos. 6,477,711, 6,671,223, 6,684,160, 6,932,017, 7,080,607, 7,293,520, and U.S. Pat. Application Publication 2006/0239117 (each of which is hereby incorporated by reference in its entirety, respectively). Any of these alternative multi-component streamers may be used in conjunction with the techniques described herein.

FIG. 1G illustrates an aerial view of a streamer array 121 in a marine-based coil survey 175 in accordance with one or more implementations of various techniques described herein.

Vessel 145 may include computing apparatus 117 that controls streamer array 121 and source 120 in a manner well known and understood in the art. The towed array 121 may include any number of streamers. In one implementation, a deflector 106 may be attached to the front of each streamer. A tail buoy 109 may be attached at the rear of each streamer. Deflector 106 and tail buoy 109 may be used to help control the shape and position of the streamer. In one implementation, deflector 106 and tail buoy 109 may be used to actively steer the streamer to the slant as described above with reference to FIGS. 1D-1E.

A plurality of seismic cable positioning devices known as "birds" 112 may be located between deflector 106 and tail buoy 109. Birds 112 may be used to actively steer or control the depth at which the streamers are towed. In this manner, birds 112 may be used to actively position the streamers in various depth configurations such as those described above with reference to FIGS. 1B-1C.

In one implementation, sources 120 may be implemented as arrays of individual sources. As mentioned above with reference to FIG. 1A, sources 120 may include marine vibroseis sources using any suitable technology known to the art, such as impulse sources like explosives, air guns, and vibratory sources. One suitable source is disclosed in U.S. Pat. No. 4,657,482 (which is hereby incorporated by reference in its entirety). In one implementation, sources 120 may simultaneously propagate energy signals. The seismic waves from sources 120 may then be separated during subsequent analysis.

In order to perform a coil survey (e.g., FIG. 1F/1H), the relative positions of vessels 143/145/147/149, as well as the shapes and depths of the streamers 121/122, may be maintained while traversing the respective sail lines 171-174 using control techniques known to the art. Any suitable technique known to the art may be used to control the shapes and depths of the streamers such as those disclosed in commonly assigned U.S. Pat. Nos. 6,671,223, 6,932,017, 7,080,607, 7,293,520, and U.S. Patent Application Publication 2006/0239117 (each of which is hereby incorporated by reference in its entirety, respectively).

As shown in FIG. 1F, the shot distribution from multi-vessel coil shooting is not along one single circle, but along multiple circles. The maximum number of circles is equal to the number of vessels. The pattern of shot distribution may be random, which may be beneficial for imaging and multiple attenuation. Design parameters for multi-vessel coil shooting may include the number of streamers, the streamer separation, the streamer length, the circle radius, the circle roll in X and Y directions, the number of vessels and the relative location of the vessels relative to a master vessel. These parameters may be selected to optimize data distribution in offset-azimuths bins or in offset-vector tiles, and cost efficiency. Those skilled in the art having the benefit of this disclosure will appreciate that these factors can be combined in a number of ways to achieve the stated goals depending upon the objective of and the constraints on the particular survey.

Although the vessel and streamers of FIG. 1F are illustrated as traveling in a generally circular path, in other implementations the vessel and streamers may be steered to travel in a generally oval path, a generally elliptical path, a FIG. 8 path, a generally sine curve path or some combination thereof.

In one implementation, some features and techniques may be employed during a survey, including but not limited to, streamer steering, single-sensor recording, large steerable calibrated source arrays, and improved shot repeatability, as well as benefits such as better noise sampling and attenuation, and the capability to record during vessel turns. Each vessel 143/145/147/149 may include a GPS receiver coupled to an integrated computer-based seismic navigation, source controller, and recording system. In one implementation, sources 120 may include a plurality of air gun sources controlled by one or more controllers adapted to fire respective air guns simultaneously, substantially simultaneously, in user-configurable sequences, or randomly.

Although FIGS. 1F-1G have been described using multiple vessels to perform a coil survey, in other implementations, the coil survey may be performed using a single vessel as described in commonly assigned U.S. Patent Application Publication No. 2008/0285381 (which is hereby incorporated by reference in its entirety). An aerial-view of an implementation of a single vessel marine-based coil survey 185 is illustrated in FIG. 1H.

In a single vessel marine-based coil survey 185, vessel 145 may travel along sail line 171 which is generally circular. Streamer array 121 may then generally follow the circular sail line 171 having a radius R.

In one implementation, sail line 171 may not be truly circular once the first pass is substantially complete. Instead, vessel 145 may move slightly in the y-direction (vertical) value of DY, as illustrated in FIG. 1I. Vessel 145 may also move in the x-direction (horizontal) by a value DX. Note that "vertical" and "horizontal" are defined relative to the plane of the drawing.

FIG. 1I is a computerized rendition of a plan view of the survey area covered by the generally circular sail lines of the coil survey as performed by a multi-vessel marine-based coil survey or a single vessel marine based coil survey over time during a shooting and recording survey. The displacement from circle to circle is DY in the vertical direction and DX in the horizontal direction. As shown in FIG. 1I, several generally circular sail lines cover the survey area. For a single vessel marine-based coil survey, the first generally circular sail line may have been acquired in the southeast corner of the survey. When a first generally circular sail path is completed, vessel 145 may move along the tangent with a certain distance, DY, in vertical direction, and starts a new generally circular path. Several generally circular curved paths may be acquired until the survey border is reached in the vertical direction. A new series of generally circular paths may then be acquired in a similar way, but the origin will be moved with DX in the horizontal direction. This way of shooting continues until the survey area is completely covered.

The design parameters for practicing a single vessel marine-based coil survey may include the radius R of the circle (the radius being a function of the spread width and the coverage fold desired), DY (the roll in the y-direction), and DX (the roll in the x-direction). DX and DY are functions of streamer spread width and of the coverage fold desired to be acquired. The radius R of the circle may be larger than the radius used during the turns and is a function of the streamer spread width. The radius R may range from about 5 km to about 10 km. In one implementation, the radius R ranges from 6 km to 7 km.

As discussed, full-azimuth seismic data can be acquired with a single vessel using circular geometry, or with multiple vessels. A further example of a multi-vessel acquisition configuration 186 that is used currently is depicted in FIG. 1J. While the configuration of FIG. 1J is similar in some respects to FIG. 1F in that two receiver vessels and two source vessels are employed, it is important to note that streamer array 187 substantially follows the coil sail path. Other type of multiple vessel configurations can be envisaged, such as two streamer vessels and three or four source vessels, or having more than two streamer vessels and more than two or three source vessels. FIG. 1K illustrates a non-limiting example of full azimuth and offset distribution 188 for two streamer vessels and two source vessels.

FIG. 1L conceptually illustrates streamer array 189 as it is towed along a first portion of a coil sail path 190 (which, in FIG. 1L, is offset to the right of the actual sail path for purposes of clarity in the figure). In some embodiments, the first portion of coil sail path 190 corresponds to part of a full sail path of a first vessel in multi-vessel acquisition configuration 186 of FIG. 1J or a coil survey arrangement as illustrated in FIG. 1I.

Significantly, FIG. 1M illustrates that, in some embodiments, a streamer array can be towed at variable depths along the length of the streamer array. The receivers deployed at variable depths along the cable (X-direction) with the constant cable depth in the crossline direction (Y-direction). The receiver depth z1 at the front of the cable is the same for all cables in this embodiment, and the receiver depth z2 at the tail of the cable is the same for all cables. To wit, the streamer array is slanted so that the leading edges of respective cables in the streamer array are at a first depth Z1, and the trailing edges of respective cables in the streamer array are at a second depth Z2 that is deeper than first depth Z1. For example, a front cable depth is 12 meters (i.e., depth Z1) for all cables in the streamer array, and the tail cable depth is 32 meters (i.e., depth Z2) for all cables in the streamer array. First depth Z1 and second depth Z2 could have different values that are determined as a function of water depth, geophysical objectives of the seismic survey, and other considerations pertinent to the survey as those with skill in the art will appreciate.

In additional embodiments, FIG. 1N illustrates where receivers on cables in the streamer array are deployed at variable depths along the streamer cable (i.e., the X-direction) and cables in the streamer array are deployed at variable depths in the crossline direction (i.e., the Y-direction). For example, the depth of the receivers along a reference cable (or first streamer in the streamer array) varies from a first depth Z1 (e.g., 8 meters) at the front of a reference cable to a second depth Z2 (e.g., 28 meters) at the tail of the reference cable; similarly, the depth of the receivers for the last streamer may range from a third depth Z3 (e.g., 18 meters) at the front end, to a fourth depth Z4 (e.g., 38 meters) at the tail of the last streamer.

FIG. 1O illustrates a non-limiting example of a slant streamer array in a perspective context. Streamer array 191 includes four streamers 191-1 through 191-4 that are towed along a sail path, which in some embodiments may be oriented along a coil. Z-axis 192, which corresponds to depths relative to surface 193, has depth markers 192-1 through 192-5, indicating increasing depth. Each streamer in array 191 is decreasing in depth from the leading edge to the trailing end of the streamer's cable (e.g., reference streamer 191-1's leading edge is at 191-1a which is between depth 192-1 and 192-2; the middle of streamer 191-1 is at depth 192-2 and thus lower than 191-1a; and the trailing end of streamer 191-1 is below depth 192-2, and thus lower than both 191-1a and 191-1b). Further, each streamer in the array 191 is deeper than its preceding neighbor, (e.g., reference streamer 191-1 is the most shallow with respect to surface 193; streamer 191-2 is deeper than streamer 191-1, etc.)

FIG. 1P illustrates a non-limiting example of a coil-slant streamer array in a perspective context. Streamer array 193 is being towed in a coil sail path (e.g., which in some embodiments may be similar to that shown in FIG. 1L coil sail path 190), and array 193 includes streamers 193-1 through 193-10 (only 193-1 and -10 of the array are labeled for purposes of clarity in the figure). Further, streamer array 193 is being towed at a slant so there is varying depth in the array (e.g., streamer 193-1 is configured to correspond to a continuously decreasing slope, as noted in the example points of a few positions on the cable 193-1a, 193-1b, and 193-1c, which are at approximate depths of 14, 20, and 32 meters, respectively). While the example of FIG. 1P illustrates that the leading edge of each of streamers 193-1 through 193-10 in array 193 are deployed at a first depth (similar to the slant arrangement of FIG. 1M), in some embodiments, array 193 can be towed in a coil-slant arrangement where the array is deployed where the leading edges of the streamers are at varying depths (similar to the slant arrangement of FIG. 1N).

Some benefits to using a slant and/or slant-coil deployment of a streamer array can include: improved low frequency preservation due to deeper cable deployments; variable receiver ghosts from receiver to receiver: this feature will facilitate receiver ghost attenuation; improved signal-to-noise ratio due to deeper cable deployments; and full azimuth acquisition due to coil shooting geometry, though those with skill in the art will appreciate that many benefits may occur when using such an acquisition geometry.

In some embodiments, data is collected with the streamer array after one or more sources are fired (which could be first data collected from one or more sources fired during the survey and/or second data collected from sources other than the one or more sources associated with the vessel towing the seismic array, e.g., collecting data from activation of sources towed by other vessels in the same survey, collecting data from activations of sources towed by other vessels in a different survey that is relatively nearby). After the data is collected is may be processed using a computing system (e.g., computing system 200A of FIG. 2), and the processing may include one or more techniques selected from the group consisting of stacking, imaging, inversion, deconvolution, migration, deghosting, reverse time migration, mirror migration, zero-phase Wiener deconvolution, and blueness correction. For example, processing locally-flat spatial windows with respect to the collected data may be used for pre-stack deghosting. In other embodiments, one may invert for upgoing wave k(p)-spectrum with respect to the collected data for pre-stack deghosting.

Computing Systems

FIG. 2 depicts an example computing system 200A in accordance with some embodiments. The computing system 200A can be an individual computer system 201A or an arrangement of distributed computer systems. The computer system 201A includes one or more analysis modules 202 that are configured to perform various tasks according to some embodiments, such as one or more methods disclosed herein. To perform these various tasks, analysis module 202 executes independently, or in coordination with, one or more processors 204, which is (or are) connected to one or more storage media 206A. The processor(s) 204 is (or are) also connected to a network interface 208 to allow the computer system 201A to communicate over a data network 210A with one or more additional computer systems and/or computing systems, such as 201B, 201C, and/or 201D (note that computer systems 201B, 201C and/or 201D may or may not share the same architecture as computer system 201A, and may be located in different physical locations, e.g., computer systems 201A and 201B may be on a ship underway on the ocean, while in communication with one or more computer systems such as 201C and/or 201D that are located in one or more data centers on shore, other ships, and/or located in varying countries on different continents).

A processor can include a microprocessor, microcontroller, processor module or subsystem, programmable integrated circuit, programmable gate array, or another control or computing device.

The storage media 206A can be implemented as one or more computer-readable or machine-readable storage media. Note that while in the example embodiment of FIG. 2 storage media 206A is depicted as within computer system 201A, in some embodiments, storage media 206A may be distributed within and/or across multiple internal and/or external enclosures of computing system 201A and/or additional computing systems. Storage media 206A may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs), digital video disks (DVDs), BluRays or other high capacity media; or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 200A is only one example of a computing system, and that computing system 200A may have more or fewer components than shown, may combine additional components not depicted in the example embodiment of FIG. 2, and/or computing system 200A may have a different configuration or arrangement of the components depicted in FIG. 2. The various components shown in FIG. 2 may be implemented in hardware, software, or a combination of both hardware and software, including one or more signal processing and/or application specific integrated circuits.

The steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of protection of the invention.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method, comprising:
    towing an array of marine streamers, wherein:
        the array includes a plurality of receivers,
        the array includes a plurality of steering devices, and
        the array is towed along a first portion of a coil sail path;
    steering the array of marine streamers along two or more depths; and
    steering the array of marine streamers to a slant angle along a crossline direction while maintaining the array of marine streamers at their respective two or more depths.

2. The method of claim 1, wherein the plurality of receivers include one or more seismic receivers.

3. The method of claim 1, wherein the plurality of receivers include one or more electromagnetic receivers.

4. The method of claim 1, wherein the array of marine streamers is steered using the plurality of steering devices.

5. The method of claim 1, wherein the plurality of steering devices comprises one or more birds, one or more deflectors, one or more tail buoys or combinations thereof.

6. The method of claim 5, wherein the array of marine streamers is steered to the two or more depths using the one or more birds.

7. The method of claim 5, wherein the array of marine streamers is steered to the slant angle using the deflectors.

8. The method of claim 5, wherein the array of marine streamers is steered to the slant angle using the tail buoys.

9. The method of claim 1, wherein the slant angle is determined at least in part based on the size of a subsurface bin from which a set of survey data is to be acquired.

10. The method of claim 1, wherein:
    respective proximate ends of one or more streamers in the array of streamers are maintained at a first depth selected from the two or more depths; and
    respective distal ends of one or more streamers in the array of streamers are maintained at a second depth selected from the two or more depths.

11. The method of claim 1, wherein the two or more depths increase in a cross line direction.

12. The method of claim 1, wherein the slant angle includes variable depths along a length of the streamer array.

13. The method of claim 1, wherein the slant angle includes variable depths along the crossline direction of the streamer array.

14. The method of claim 1, wherein the slant angle includes variable depths along the crossline direction of the streamer array and variable depths along a length of the streamer array.

15. The method of claim 1, further comprising:
    towing one or more sources; and
    producing one or more energy emissions from the one or more sources while towing the array of marine streamers in the first portion of the coil sail path.

16. The method of claim 15, wherein the one or more sources are towed by a first vessel, and the streamer array is towed by a second vessel.

17. The method of claim 15, wherein the one or more sources and the streamer array are towed by a first vessel.

18. The method of claim 15, further comprising collecting data at one or more of the plurality of receivers, wherein the collected data corresponds to respective returns from the subsurface of respective energy emissions in the one or more energy emissions emitted from the one or more sources.

19. The method of claim 18, further comprising processing the collected data, wherein the processing includes one or more techniques selected from the group consisting of stacking, imaging, inversion, full waveform inversion, deconvolution, migration, deghosting, reverse time migration, mirror migration, zero-phase Wiener deconvolution, and blueness correction.

20. A method, comprising:
   receiving a data set collected by a plurality of marine streamers having a plurality of receivers, wherein:
      the received data set corresponds to a subterranean region, and
      while collecting the data set, the plurality of marine streamers was towed:
         along a first portion of a coil sail path,
         at a slant angle along a crossline direction, and
         maintaining the marine streamer at two or more depths; and
   processing the collected data, wherein the processing includes one or more techniques selected from the group consisting of stacking, imaging, inversion, full waveform inversion, deconvolution, migration, deghosting, reverse time migration, mirror migration, zero-phase Wiener deconvolution, and blueness correction.

21. A survey system, comprising:
   a vessel, and
   a steerable array of marine streamers including a plurality of receivers and a plurality of steering devices, wherein:
      the steerable array of marine streamers is configured to be towed along two or more depths along a coil sail path, and
      the steerable array of marine streamers is configured to be steered to a slant angle along a crossline direction while maintaining the array of marine streamers at their respective two or more depths.

* * * * *